March 25, 1941. K. MARGGRAF 2,236,340
DAMPING MEANS FOR GYROSCOPIC INSTRUMENTS
Filed May 3, 1939
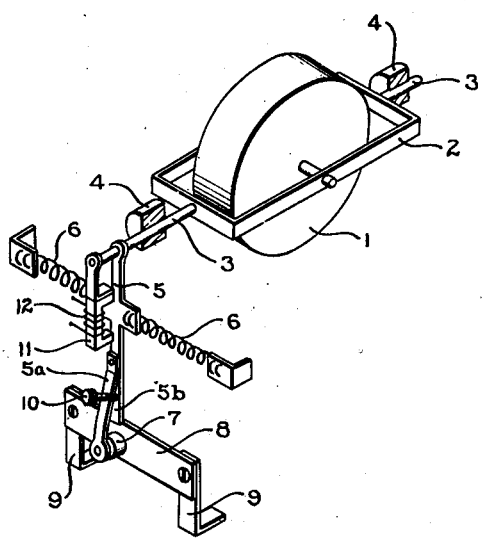
INVENTOR.
Kurt Marggraf
BY
Stephen Cristvik
ATTORNEY.

Patented Mar. 25, 1941

2,236,340

UNITED STATES PATENT OFFICE 2,236,340

DAMPING MEANS FOR GYROSCOPIC INSTRUMENTS

Kurt Marggraf, Berlin-Pankow, Germany, assignor to Siemens Apparate und Maschinen Gesellschaft mit beschränkter Haftung, Berlin, Germany, a corporation of Germany Application May 3, 1939, Serial No. 271,601
In Germany April 28, 1938

2 Claims. (Cl. 74—5)

This invention relates to damping means, and more particularly to damping means for measuring, indicating or control instruments.

One of the objects of the present invention is to provide novel damping means which does not decrease the sensitiveness of the apparatus to which it is attached.

Another object of the invention is to provide novel means of the above character which are simple and light in construction and therefore adapted for use aboard vehicles such as aircraft.

An additional object is to provide novel means of the above character which may be employed for damping the movements of a movable member which member may normally oscillate with a large amplitude or only a very small amplitude.

The above and further objects and novel features will more fully appear when the same are read in connection with the accompanying drawing. It is to be expressly understood, however, that the drawing is for purposes of illustration only and is not intended as a definition of the limits of the invention, reference for this latter purpose being had to the appended claims.

The drawing is a perspective view of one embodiment of the invention.

The form of the invention illustrated, by way of example, comprises a damping device for measuring, indicating or control instruments, which is constituted by two frictionally engaged members, one of which is operatively connected to the instrument to be damped and the other of which is mounted for movement relative to the first member. In order to prevent the frictionally engaged members from reducing the sensitiveness of the apparatus, means are provided for oscillating one of said members in a plane perpendicular to the plane in which the frictional engagement occurs.

In the form shown in the figure, the present device is employed for damping the movements of a control system comprising a measuring device, for example, a turn indicator for aircraft, which is constituted by a gyro rotor 1 in gimbal frame suspension. The latter term herein refers to a suspension permitting two degrees of freedom as opposed to a gimbal ring suspension which ordinarily refers to a suspension allowing three degrees of freedom. The gimbal frame suspension is constituted by a frame 2 having trunnions 3 thereon, the coincident axes of which are perpendicular to the axis of rotation of the rotor 1. Trunnions 3 are rotatably mounted in fixed bearings 4.

Suitable means for damping any oscillatory movement of the gyro are provided comprising two members which frictionally engage one another, the first member, for example, being constituted by an arm 5 which is rigidly attached to a trunnion 3 and which is normally retained in a centralized position in a yielding manner by means of opposed springs 6. Arm 5 is provided adjacent the extremity thereof with a leaf or laminated spring 5a to which is secured a cap shaped friction surface 7 which engages a second friction member 8 under the pressure of spring 5a. Member 8 in the embodiment illustrated is fixedly mounted relative to arm 5, for example by brackets 9 which are secured to the craft. In order to regulate the intensity of the frictional engagement between surface 7 and member 8, a set screw 10 is provided in the leaf spring 5a which passes therethrough and which engages a depending portion 5b of the arm 5.

It is possible that the member of the instrument or system which is to be damped by the present device may attempt to move a very slight amount but fail in this attempt because of the continuous frictional engagement of members 7 and 8. In order to avoid this drawback in such a manner that an efficient damping action will continue but without a sacrifice to sensitiveness, means are provided for periodically moving one of the friction members in a plane perpendicular to the plane in which the frictional engagement takes place. The novel means are here constituted, for example, by an electro-magnet 11 which is mounted for angular movement with a trunnion 3, adjacent the arm 5. A coil 12 of the magnet is connected to a suitable source of periodically changing current (not shown).

In operation, if, as a result of a turn of the aircraft, a moment is exerted upon the gyro about an axis which is perpendicular to the plane determined by the axis of rotation of the gyro and the axis of the frame trunnions, the gyro will precess about said trunnions. The motion of the arm 5 due to precession and also the return motion thereof after precession has occurred is damped by the frictional engagement of the members 7 and 8, while the electro-magnet oscillates the arm 5 in a plane perpendicular to the plane of frictional engagement.

There is thus provided a novel damping device which is easily adapted for use in combination with a wide variety of apparatus, in particular measuring or indicating devices, wherein a damping action is needed for some member thereof without reducing the ease of motion of the member. In general, it may be used for any desired measuring, indicating or control instrument or system, especially for such systems which are free of oscillations. The novel damping means are light, simple, inexpensive to manufacture, rugged and consequently are especially adapted for use aboard aircraft.

Although only one embodiment of the invention has been illustrated and described in detail, it is to be expressly understood that the same is not limited thereto; for example, the arm 5 can be employed for indicating or control purposes. In the latter case, there may be provided any conventional resistance transmitter system which may be controlled by said arm. Further, the electro-magnet may be fixedly disposed relative to the moving members, for example, on the wall of a housing for the instrument, or upon the friction member 8. Also, the arm 5 may be operatively connected to an oscillating or vibrating diaphragm which may be energized by alternating current. The two friction members with respect to their relative movement may be interchanged. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. A rate of turn responsive gyroscope for an aircraft, comprising a rotor, a gimbal mounting said rotor for spinning about a horizontal axis, said gimbal being mounted for angular movement about a second axis perpendicular to the first axis, means yieldingly opposing the angular movement of said gimbal about said second axis whereby the angle of movement is a function of the rate of turn of said aircraft, an arm included in said opposing means and connected with said gimbal for movement therewith, means comprising a stationary member adjacent said arm, resiliently urged means carried by said arm for frictionally engaging said stationary member during angular movement of said gimbal and said arm relative to said stationary member thereby preventing oscillations of said arm, and electromagnetic means secured with said gimbal adjacent said arm for periodically moving said arm in a plane perpendicular to the plane of frictional engagement thereby periodically breaking said frictional engagement.

2. A rate of turn responsive gyroscope for an aircraft, comprising a rotor, a gimbal mounting said rotor for spinning about a horizontal axis, said gimbal being mounted upon trunnions rotatable in fixed bearings for angular movement about a second axis perpendicular to the first axis, means yieldingly opposing the angular movement of said gimbal about said second axis whereby the angle of movement is a function of the rate of turn of said aircraft, an arm included in said opposing means and connected with one of said trunnions for movement with said gimbal, means comprising a stationary member adjacent said arm, resiliently urged means carried by said arm for frictionally engaging said stationary member during angular movement of said gimbal and said arm relative to said stationary member thereby preventing oscillations of said arm, and an electromagnet secured for movement with said last-named trunnion adjacent said arm for periodically moving said arm in a plane perpendicular to the plane of frictional engagement thereby periodically breaking said frictional engagement.

KURT MARGGRAF.